G. W. CRANER.
Waste-Removing Devices for Carding-Machines.
No. 140,814. Patented July 15, 1873.
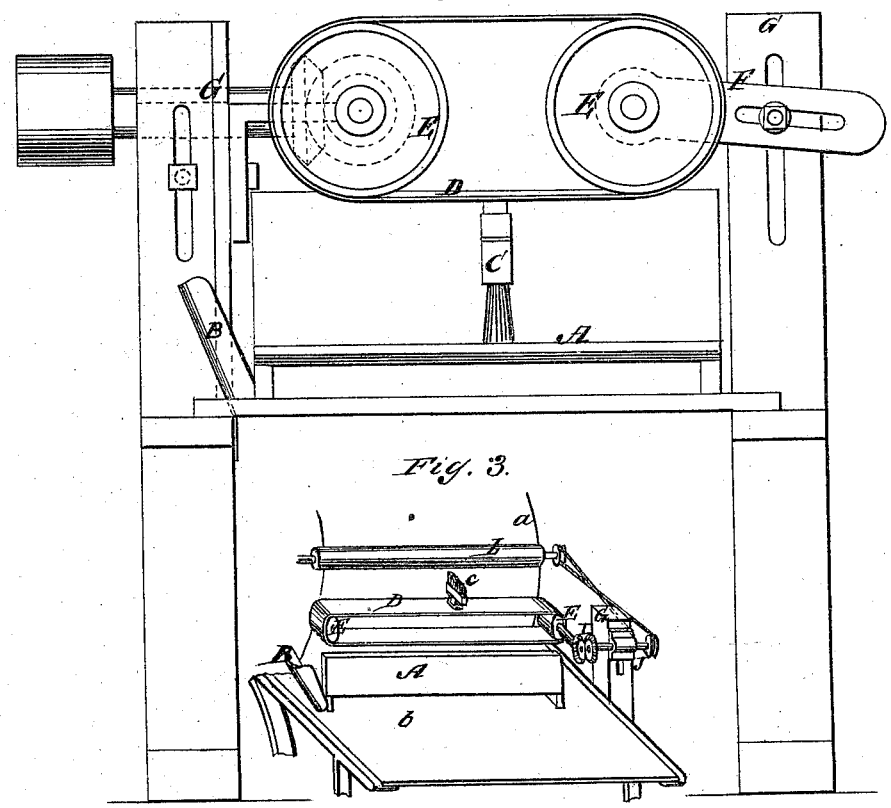
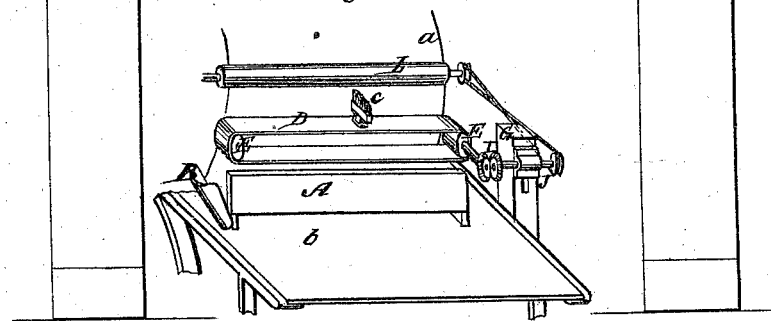
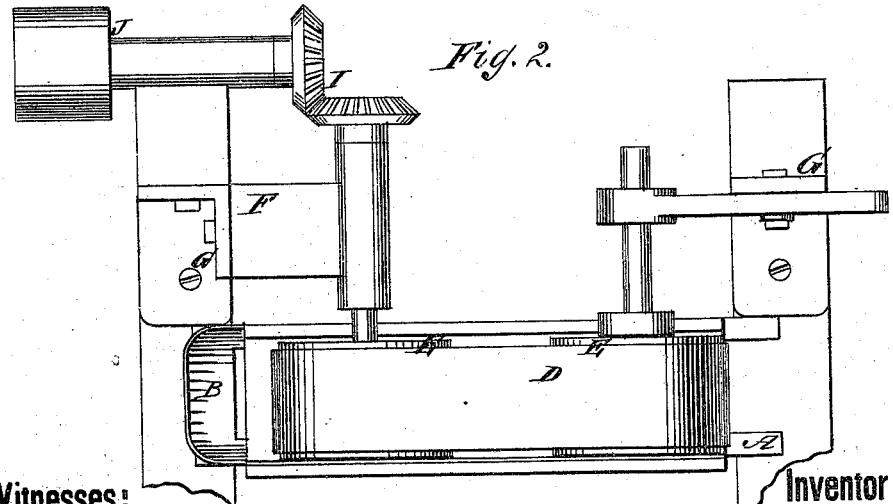

UNITED STATES PATENT OFFICE.

GEORGE W. CRANER, OF DARBY, PENNSYLVANIA.

IMPROVEMENT IN WASTE-REMOVING DEVICES FOR CARDING-MACHINES.

Specification forming part of Letters Patent No. 140,814, dated July 15, 1873; application filed June 14, 1873.

*To all whom it may concern:*

Be it known that I, GEORGE W. CRANER, of Darby, in the county of Delaware and State of Pennsylvania, have invented a new and useful Improvement in Carding-Machines, of which the following is a specification:

My invention consists of a brush and an endless carrier for it combined with the burr-box of a carding-machine, in such manner that it brushes out the burrs, and, by keeping it clear of them, prevents it from filling and the burrs from overflowing upon the main card, which often happens with the ordinary burr-boxes by the lack of attention or forgetfulness of the attendant.

Figure 1 is a side elevation of my improved burr-box clearing attachment. Fig. 2 is a plan view, and Fig. 3 is a perspective view, showing the application of the attachment to the carding-machine.

Similar letters of reference indicate corresponding parts.

A represents the bottom of the ordinary burr-box, commonly arranged by the side of the main cylinder *a* above the feed-board *b* of the first breaker, so that the burrs thrown off thereat by the cylinder will be received on it. I propose to arrange a spout, B, at one end of this box to conduct the burrs into any suitable receptacle below, and provide a brush, C, on an endless carrier, D, to run slowly over the box-bottom toward the spout to sweep off the burrs and prevent any accumulation on it, and thus avoid the returning of them to the cylinder again, as they sometimes do. The endless carrier D is arranged on the pulleys E in brackets F, which are arranged on standards G so as to be adjustable vertically to regulate the brush to the box, and one of said brackets is adjustable to regulate the tension of the belt or carrier D. The shaft of one of the carrier-pulleys gears, by bevel-wheel I, with a short shaft and pulley, J, which is to be driven by a belt from the worker L of the carding-machine for driving the brush.

Having thus described my invention, I claim as new and desire to secure by Letters Patent—

The combination of a brush and an endless carrier with the burr-box of a carding-machine, substantially as specified.

GEORGE W. CRANER.

Witnesses:
PHILIP R. JOHNSON,
J. C. ANDREWS.